Dec. 2, 1969     A. W. PETRI     3,481,472
FILTER CARTRIDGE
Filed July 24, 1968
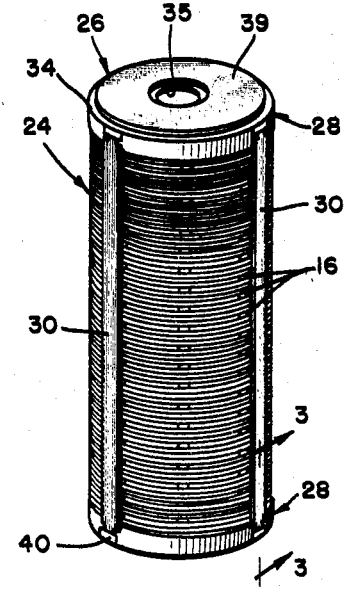
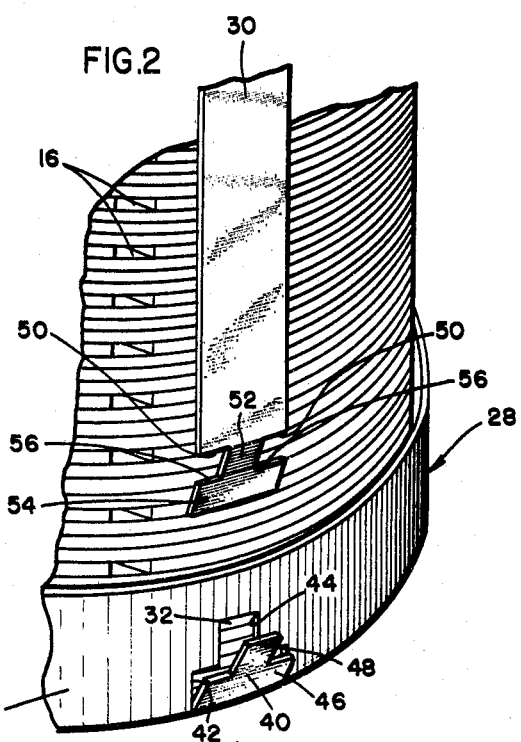
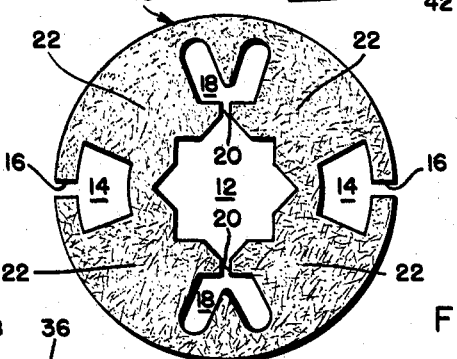
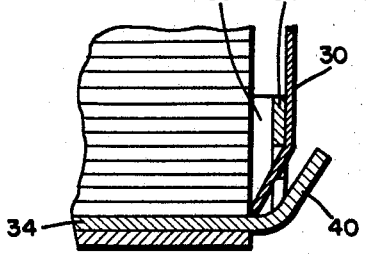
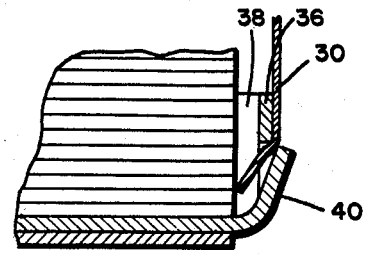
INVENTOR
ANDREW W. PETRI
Anderson, Luedeka, Fitch, Even & Tabin
ATTYS.

United States Patent Office 3,481,472
Patented Dec. 2, 1969

3,481,472
FILTER CARTRIDGE
Andrew W. Petri, Morton Grove, Ill., assignor to Wm. W. Nugent & Co. (Inc.), Skokie, Ill., a corporation of Illinois
Filed July 24, 1968, Ser. No. 747,323
Int. Cl. B01d 27/04, 27/00
U.S. Cl. 210—232                                   10 Claims

ABSTRACT OF THE DISCLOSURE

A filter cartridge is provided which, in the illustrated embodiment, includes a stack of filter discs, and a bezel at each end of the stack having openings which receive the ends of straps which extend between the bezels and secure them together. The ends of the straps and the openings of the bezels are so shaped that when the end of the strap is properly positioned within the opening of the bezel the strap will remain attached to the bezel despite tensile forces applied to the strap during assembly and use of the cartridge.

---

The present invention relates generally to filter cartridges formed from a plurality of filter discs arranged in a stack. The invention relates more particularly to means for maintaining the discs in stack form.

One form of filter cartridge (sometimes referred to as a "recharge") which is used extensively in the filtering of oil consists of a plurality of circular discs formed of a fibrous material such as wood pulp, paper, felt or the like and arranged one atop the other to form a stack. One particularly effective form of disc and cartridge formed therefrom is disclosed in U.S. Patent No. 2,604,994 which issued July 29, 1952. The disc of that patent is illustrated in FIGURE 5 herein where it is designated by the numeral 10. Very generally, it includes a central opening 12 having the configuration of an eight-pointed star. A cut-out or aperture 14 of generally trapezoidal configuration is provided on each of opposite sides of the opening 12, and each cut-out communicates with the periphery of the disc through an inlet passageway 16, thereby enabling the aperture 14 to define an inlet chamber in the completed stack, as hereinafter described. A generally V-shaped cut-out or aperture 18 is also provided on each of opposite sides of the central opening 12 but circumferentially spaced in relation to the apertures 14 by ninety degrees. Each aperture 18 communicates with the central opening 12 through an outlet passageway 20, thereby enabling it to define an outlet chamber in the completed stack. Those portions of the disc 10 intermediate adjacent apertures 14 and 18 define filtering areas 22.

The filter discs 10 are arranged to form a stack 24 (FIG. 1) in which each successive disc is rotationally displaced forty-five degrees out of vertical alignment with the immediately overlying disc so that each aperture 14 is in vertical alignment with a filtering area 22 of an overlying disc, and that filtering area is in turn vertically aligned with an aperture 18. Thus, throughout the stack, inlet chambers defined by apertures 14 are separated vertically from outlet chambers defined by apertures 18 by filtering areas 22 which, ideally, provide the only path of communication between the chambers.

During use, the filter cartridges are placed in vessels or housings in communication with a conduit carrying the fluid to be filtered, and the fluid is pumped under pressure into and out of the vessel. In order to prevent the pressure of the fluid from separating the discs and bypassing the filtering areas 22, the stack is maintained within the vessel under a compressive force which not only counteracts the pressure of the fluid which tends to separate the discs, but also compensates for shrinkage of the discs which occurs during use and which tends to shrink the stack.

It is necessary that the discs which form the cartridges be properly oriented relative to each other if the cartridge is to function properly. Thus, it is necessary that the discs be placed in proper orientation relative to each other during assembly of the stacks and that they be maintained in such orientation during shipment, storage and insertion into the vessel. It is also important that they remain secured together as a unit until the cartridge is replaced despite shrinkage of the stack so that they can be easily removed from the vessel and discarded.

One known approach to maintaining the discs in proper orientation is to compress the stack and then bind it so as to maintain at least some of the compression, the resulting frictional force at the interfaces serving to maintain the desired relative positioning and the binding members serving to tie the discs together for eventual removal from the vessel even though the original compressive pressure no longer exists because of the shrinkage of the discs. Accordingly, in the assembly of such cartridges, it is customary to place a stack of the discs in a press, to apply a compressive force to the stack by means of the press, and then, while the stack is still in compression, to bind the discs together in such a manner that when the cartridge is removed from the press and the original compressive force released, at least some of the compressive force is maintained by the binding members.

Frequently, the means for securing the discs together includes a cap positioned at each end of the stack and straps or wires interconnecting the two caps. In some instances, straps are passed through slots in the caps, reversed upon themselves, and spot-welded together. This method, however, is not particularly satisfactory since the spot-welding operation is time-consuming and awkward and creates a fire hazard due to the highly flammable nature of the filtering material which is usually present in large amounts in the area surrounding the press.

In other instances, wires are provided which pass through openings in each of the caps and are then twisted or knoted or secured to a tab or similar extrusion which projects from the outer surface of one or both of the caps. After the wire is secured to the tab or extrusion, the tab is hammered flat to secure the wire in place. This method is also not entirely satisfactory. The provision of the tab or extrusion on the cap requires additional tooling and machining, and the attachment, twisting and tying of the wire and hammering of the tab is time-consuming. Finally, the tabs or extrusions necessarily project beyond the outer surface of the cap and occasionally leave sharp burrs or corners which are dangerous to persons handling the cartridge.

It is therefore a principal object of the present invention to provide an improved method and means for assembling filter discs into a stack and for maintaining them in stack form.

Other objects and advantages of the invention will become apparent with reference to the following description and the accompanying drawing.

In the drawing:
FIGURE 1 is a perspective view of a filter cartridge showing various of the features of the invention;
FIGURE 2 is an enlarged fragmentary partially exploded perspective view of a portion of the cartridge of FIGURE 1;
FIGURES 3 and 4 are fragmentary elevational views, partially in section, taken along line 3—3 of FIGURE 1, showing the cartridge of FIGURE 1 in its completed form (FIG. 4) and at an intermediate stage of its assembly (FIG. 3); and FIGURE 5 is a plan view of a filter disc such as might be used to form the cartridge of FIGURE 1.

Very generally, the stack 24 formed of discs 10, as previously described, is embodied in a cartridge 26 which includes, in addition to the stack 24, a pair of end plates or bezels 28 interconnected by straps or bands 30. The bezels 28 are provided with openings 32 and the ends of the straps are so shaped that when they are inserted into and properly positioned within the openings they become sufficiently attached to the bezels to bind them together.

Referring now more specifically to the drawing, the cartridge 26, constituting one embodiment of the present invention, is adapted to be used in conjunction with a filter vessel (not shown) similar to that shown in U.S. Patent No. 2,604,994. Although this vessel will not be described in detail herein, it may be assumed that it includes an inlet which communicates with the external or outer cylindrical surface of the cartridge and an outlet which communicates with the interior or central opening of the cartridge. It may also be assumed that the stack 24 is compressed within a suitable press and that it is bound by the bezels 28 and straps 30 while in the compressed state.

The plates or bezels 28 include a generally flat circular base 34 provided with a central hole 35 and with an outwardly projecting peripheral side wall or flange 36. Thus, the bezel is somewhat cup-shaped and defines a cavity, so to speak, into which one end of the stack is received. The internal diameter of the cavity is dimensioned relative to the outer diameter of the disc so as to provide an annular clearance or space 38 intermediate the side of the stack and the side wall 36 of the bezel (FIGS. 3 and 4). In one preferred embodiment, the difference between the outer diameter of the stack 24 and the inner diameter of the cavity defined by the side wall 36 is 1/8 inch, providing an average clearance about the periphery of the stack of approximately 1/16 inch. This clearance has been exaggerated in FIGURES 3 and 4 for ease of illustration.

An annular gasket 39 is secured to the outer surface of the base 34 of each bezel in concentric relation to the hole 35.

The side wall of each bezel 28 is punched out at three locations spaced equally circumferentially around the base 34 to provide tabs 40 and create the openings 32. Each opening 32 is generally of T-shaped configuration. the cross arm 42 of which has its outer edge at the line of juncture between the base 34 and side wall 36 and the leg 44 of which extends away from the base toward the outer edge of the side wall. In FIGS. 2–4, the lowmost end bezel of a vertically oriented cartridge is shown in detail and the T-shaped opening 32 thus appears in an inverted position.

The tab 48 of each opening 32 is foldably attached to the bezel along a fold line generally coincident with the line of juncture between the cross arm 42 of the opening 32 and the periphery of the base 34 of the bezel. The tab 40 is of the same configuration as the opening 32 so as to include a cross arm 46 and a leg 48. The tab may be exactly the same size as the opening 32 or the leg 48 of the tab may be slightly shorter than the leg 44 of the opening to provide a slight gap at the outer end of the leg 48 when in the position shown generally in FIGURE 4 to allow room for a portion of the strap 30, for reasons which will hereinafter become apparent.

The bezels 28 at opposite ends of the stack 24 are linked or interconnected by three of the straps 30. That is, a strap 30 extends between each opening 32 of one bezel and a corresponding opening 32 of the opposite bezel, the straps extending generally parallel to the longitudinal axis of the stack. Each strap 30, which is preferably formed of steel of high tensile strength, is provided with a pair of opposed notches 50 adjacent each of its ends (FIG. 2), each notch being generally rectangular and extending inwardly from opposite side edges of the strap. The notches thus form a narrowed portion or neck 52 spaced inwardly from the end of the strap and define a head 54 at the end of the strap which is of considerably wider width than the neck. The edge created at the juncture between the head and neck defines a shoulder 56 which is disposed transversely of the longitudinal axis or length of the strap.

The width of the head 54 of the strap is preferably slightly less than the width of the cross arm 42 of the opening 32, and the width of the neck is preferably slightly less than the width of the leg 44 of the opening. The clearance is preferably such that the head and neck of the strap may be inserted into the opening 32 without difficulty. It will be appreciated that if, after such insertion, the head 54 is moved away from the base 34 of the bezel toward the free or outer edge of the side wall 36, the outwardly projecting portion of the head will be positioned behind those portions of the side wall flanking the leg 44 of the opening and within the space 38 intermediate the inner surface of the side wall 36 and the outer cylindrical surface of the stack 24. Moreover, the transverse shoulder 56 of the strap will engage the edge of the opening 32 which defines the outer end of the leg 44. Thus, the strap will be locked within the opening against a tensile force applied to the strap. When each end of each strap is connected to a bezel in this manner while the stack is in compression in a press, the stack will be maintained in compression by the straps when the compressive forces applied by the press are released.

It will be appreciated that because of the movement of the head 54 of the strap to a position in which the projecting side portions of the head are behind that portion of the side wall 36 flanking the leg 44 of the opening 32, it is desirable to over-compress the stack somewhat to attach the straps. The stack will therefore expand after the pressure is released before the straps are placed in tension.

To facilitate insertion of the head and neck of the straps into the openings 32, the outer end portions of the straps are offset transversely, in the same direction, so that a strap may be positioned adjacent the compressed stack with the ends of the strap projecting inwardly toward the interior of their respective openings. In the illustrated embodiment, the ends are offset along a line coincident with the juncture between the neck 52 and the remainder of the strap.

In assembling the cartridge, the discs 10 are arranged in a stack properly oriented relative to each other and a bezel 28 is placed at each end of the stack. The stack and bezels are then placed in a press and compressed. This compression is at least sufficient to permit both ends of each strap 30 to be inserted into the openings 32, allowing for the fact that the head 54 of the strap must be moved within the opening a short distance (the length of the leg 34 of the opening) before the strap becomes effective. After the ends of the strap are so inserted, the compressive forces applied by the press are released and the stack is allowed to expand until the straps preclude any further expansion.

It will be noted that during assembly of the cartridge, the tabs 40 project outwardly of the bezel to expose the opening 32 and facilitate entry of the end of the strap into the opening. The tabs might conceivably be removed entirely from the bezel since they do not serve to maintain the straps in place once the straps are in tension. However, it has been found advantageous to push the tabs back into the opening 32 during assembly to close the opening so that the straps will remain in place and serve to maintain the discs in stack form after the cartridge has been used and the stack has shrunk so that the straps are no longer in tension. The final position of the tab in a preferred embodiment is shown in FIG. 4. However, it will be appreciated that if the leg 48 of the tab were made somewhat shorter, the tab could be completely inserted into the plane of the opening 32 while still permitting accommodation of the strap 30.

An improved filter cartridge has thus been disclosed which can be easily assembled with a minimum of time and effort. While one specific structural embodiment has been shown and described, it should be apparent that various modifications may be made therein without departing from the scope of the invention.

What is claimed is:

1. In a filter cartridge which includes a plurality of filtering discs arranged in a stack, means for maintaining the discs in stack form comprising a first plate disposed generally flush with one end of the stack, straps secured to and extending outwardly from said first plate toward the opposite end of the stack in uniformly spaced relation circumferentially around the stack, each strap being formed to provide an edge defining a transverse shoulder adjacent its outer end facing in the direction of said first plate, and a second plate disposed generally flush with the opposite end of the stack and engageable by the outer ends of said straps, said second plate being provided with an opening for each strap respectively, said openings being uniformly spaced from each other circumferentially, each of said openings being formed to receive the end portion of its respective strap, said second plate including means adjacent each of said openings engageable by said transverse shoulder of the respective strap of that opening to retain the end portion of said strap in said opening against a tensile force on said strap tending to move said first and second plates in opposite directions away from each other.

2. A combination as set forth in claim 1, wherein the outer end portion of each of said straps is formed to provide a head and a neck inwardly of the head, said neck being of a significantly lesser width than said head at the juncture therebetween, thereby defining said transverse shoulder at said juncture, and wherein each of said openings is elongated and has a width at its one end farthest from said first plate in the direction of its strap which is at least as wide as said head of said strap and has a width at its opposite end which is at least as wide as the said neck of said strap but narrower than said head so that when said head is inserted into the said one end of the opening and moved to the opposite end thereof the shoulders of the said strap engage the surfaces of the plate adjoining the said opening, thereby preventing withdrawal of the head through the opening and linking the plates together.

3. A combination as set forth in claim 1, wherein said openings in said second plate are located in portions of said second plate which extend in the direction of said first plate.

4. A combination as set forth in claim 3, wherein said extending portions are defined by a continuous flange defining a side wall which extends in the direction of said first plate.

5. A combination as set forth in claim 1, wherein said first plate is provided with openings similar to the openings in said second plate, and wherein each of said straps is provided with a transverse shoulder at each of its ends, said straps being thereby secured to said first plate in the same manner in which they are secured to said second plate.

6. A combination as set forth in claim 1, wherein each of said openings in said second plate is formed by offsetting a portion of said plate outwardly, and wherein said offset portion is returned to approximately its original position after the end of the strap has been secured therein.

7. A combination as set forth in claim 2, wherein each opening is generally T-shaped and disposed with its cross arm located generally at the base of a portion of said second plate which extends in the direction of said first plate.

8. A combination as set forth in claim 1, wherein three straps are provided.

9. A combination as set forth in claim 2, wherein said neck of each of said straps is provided by forming a notch in each of opposite longitudinal side edges of said strap, said notches opposing each other and being located in inwardly spaced relation to the end of said strap.

10. A combination as set forth in claim 2, wherein the head and neck portion of each strap is offset relative to the remainder of the strap along a transverse line located at the inner end of said neck to facilitate insertion of the head into one of said openings in said second plate.

References Cited

UNITED STATES PATENTS 2,604,994   7/1952   Vocelka _____ 210—492

REUBEN FRIEDMAN, Primary Examiner

T. A. GRANGER, Assistant Examiner

U.S. Cl. X.R.

210—492